(12) United States Patent
Ren et al.

(10) Patent No.: US 11,973,459 B2
(45) Date of Patent: Apr. 30, 2024

(54) PRESSURE-DRIVEN SOLAR PHOTOVOLTAIC PANEL AUTOMATIC TRACKING DEVICE

(71) Applicants: Tsinghua University, Beijing (CN); HON HAI PRECISION INDUSTRY CO., LTD., New Taipei (TW)

(72) Inventors: Jian-Xun Ren, Beijing (CN); Jun-Hong Hao, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 15 days.

(21) Appl. No.: 17/490,094

(22) Filed: Sep. 30, 2021

(65) Prior Publication Data

US 2022/0239248 A1    Jul. 28, 2022

(30) Foreign Application Priority Data

Jan. 28, 2021   (CN) .......................... 202110116793.3

(51) Int. Cl.
*H02S 20/32*   (2014.01)
*F24S 30/00*   (2018.01)
*F24S 30/425*  (2018.01)

(52) U.S. Cl.
CPC ............ *H02S 20/32* (2014.12); *F24S 30/425* (2018.05); *F24S 2030/115* (2018.05); *F24S 2030/136* (2018.05); *F24S 2030/18* (2018.05); *F24S 2030/19* (2018.05)

(58) Field of Classification Search
CPC ... H02S 20/32; F24S 30/425; F24S 2030/115; F24S 2030/136; F24S 2030/18; F24S 2030/19; F24S 50/20; F24S 2030/133; Y02E 10/50; G05D 3/20; F04B 49/00; F16F 15/02

See application file for complete search history.

(56) References Cited

U.S. PATENT DOCUMENTS

| | | | |
|---|---|---|---|
| 10,240,574 B1 * | 3/2019 | Anich | F24S 60/00 |
| 2012/0152306 A1 * | 6/2012 | Iqbal | H01L 31/0504 29/592.1 |
| 2013/0092154 A1 * | 4/2013 | Lu | F24S 30/425 126/685 |
| 2018/0358922 A1 * | 12/2018 | Plesniak | F16H 57/039 |
| 2019/0372512 A1 * | 12/2019 | Betts | F24S 25/12 |

* cited by examiner

*Primary Examiner* — Angelo Trivisonno
(74) *Attorney, Agent, or Firm* — ScienBiziP, P.C.

(57) ABSTRACT

A pressure-driven solar photovoltaic panel automatic tracking device includes a photovoltaic panel, a rotating shaft, a rotating wheel, a transmission component, a first counterweight, a second counterweight, a bellow tube, and a gas supply mechanism; the photovoltaic panel is fixed to the rotating shaft, the rotating wheel is fixed to the rotating shaft, the rotating wheel is provided with the transmission component, and both ends of the transmission component are respectively connected to the first counterweight and the second counterweight; the first counterweight is connected to the bellow tube, and the bellow tube is connected to the gas supply mechanism; and the bellow tube is expanded and contracted by controlling the gas supply mechanism, so that the first counterweight moves in the vertical direction, thereby driving the rotating wheel to rotate, so as to realize the automatic tracking of the sunlight by the photovoltaic panel.

12 Claims, 4 Drawing Sheets

PRESSURE-DRIVEN SOLAR PHOTOVOLTAIC PANEL AUTOMATIC TRACKING DEVICE

FIELD

The present application relates to an application field of a solar photovoltaic technology, in particular to a pressure-driven solar photovoltaic panel automatic tracking device.

BACKGROUND

Facing the challenges of energy security, environmental pollution and climate change, vigorously developing solar photovoltaic power generation technology is an important path to build a clean, low-carbon, safe and efficient energy system. With the continuous development and application of photovoltaic power generation technology, the conversion efficiency of photovoltaic power generation needs to be further improved. On one hand, it is necessary to develop new photoelectric conversion technologies. On the other hand, it is necessary to increase the utilization rate of light, adjust the light receiving angle of the photovoltaic panel power generation components in real time, and track the movement of sunlight as much as possible, which can improve the power generation capacity.

For the solar photovoltaic panel real-time tracking device, devices such as photosensitivity, thermal sensitivity drive and mechanical control have been developed. Existing photovoltaic panel tracking device generally includes a rotating shaft, a photovoltaic panel, a driving motor, and a deceleration mechanism. The photovoltaic panel is located on the rotating shaft, and the driving motor drives the rotating shaft to rotate through the deceleration mechanism, thereby driving the photovoltaic panel to rotate, to realize automatic tracking of sunlight. The photovoltaic panel tracking device rotates 80 degrees to 120 degrees in a day, and the angular speed of rotation is small, so the deceleration mechanism needs to have a relatively large reduction ratio. It is difficult to achieve ultra-low uniform speed rotation, so the photovoltaic panel is generally controlled intermittently, and the angle of the photovoltaic panel is adjusted at intervals, so that the light energy utilization rate is low. Due to intermittent control, the driving motor needs to be started frequently. The operating current of the driving motor is relatively large at the moment of instant start, and the instantaneous input power and the impact on the motor are both relatively large, thereby affecting the working life of the motor, and the hardware resources of the drive system are also wasted. The motor-deceleration mechanism is running in the wind, rain and dust environment for a long time, and the failure rate is relatively high. Thus, the commercial promotion and use of the photovoltaic panel automatic tracking device are limited.

Therefore, there is room for improvement in the art.

BRIEF DESCRIPTION OF THE DRAWINGS

Implementations of the present technology will now be described, by way of embodiments, with reference to the attached figures, wherein.

DETAILED DESCRIPTION

Figure 1:
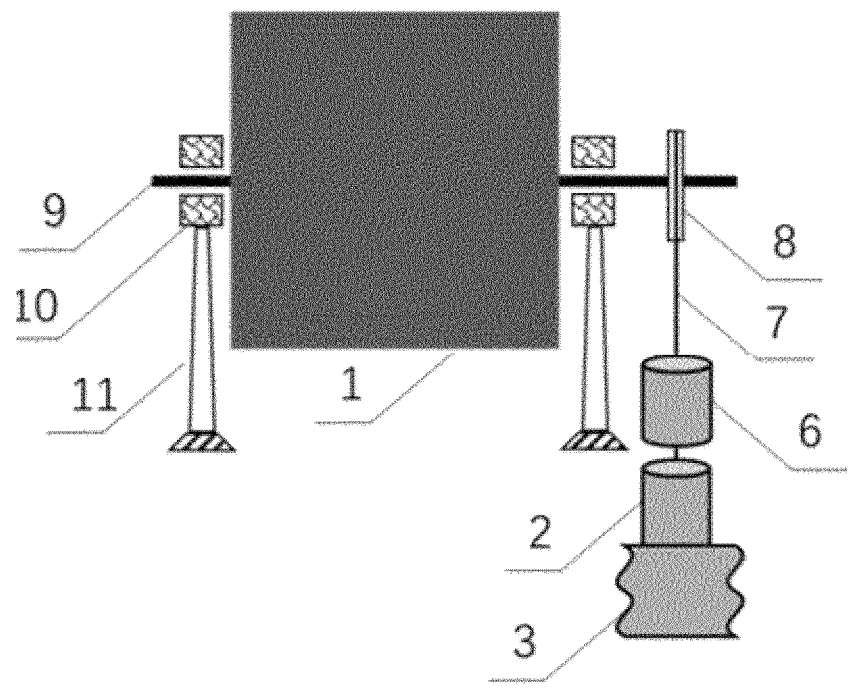
FIG. 1 shows a schematic front view of a pressure-driven solar photovoltaic panel automatic tracking device of one embodiment according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to illustrate details and features better. The description is not to be considered as limiting the scope of the embodiments described herein.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 2:
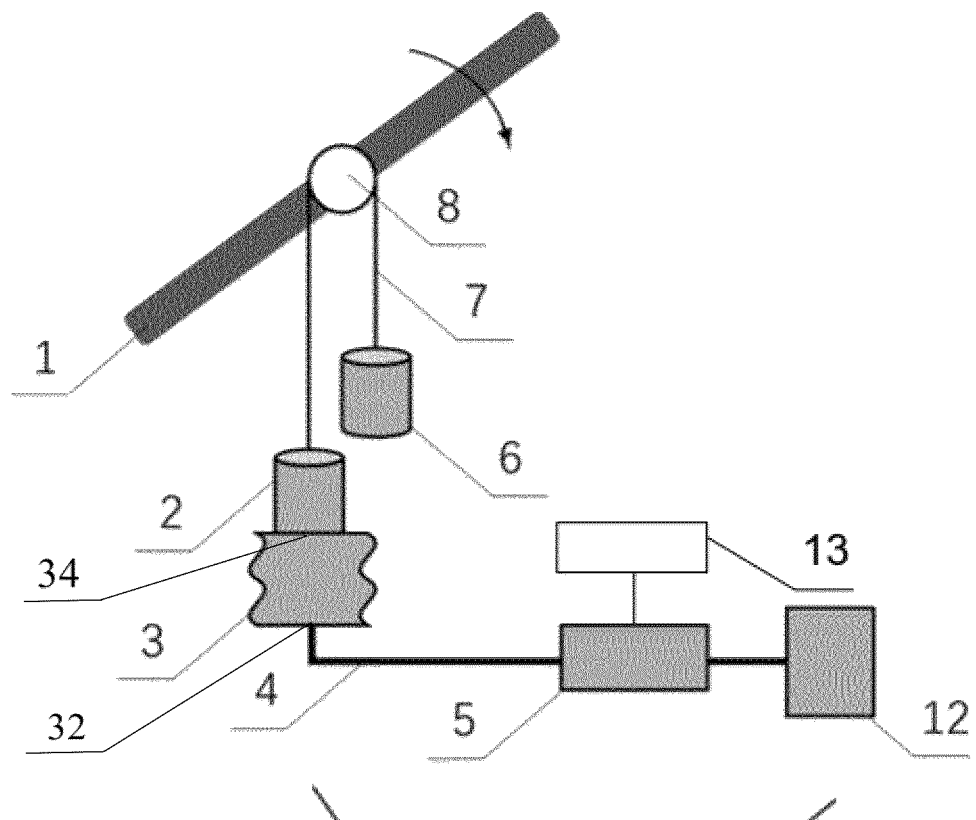
FIG. 2 shows a schematic left view of the pressure-driven solar photovoltaic panel automatic tracking device of one embodiment according to the present disclosure.

Referring to FIG. 1 and FIG. 2, a pressure-driven solar photovoltaic panel automatic tracking device 100 of one embodiment is provided. The pressure-driven solar photovoltaic panel automatic tracking device 100 includes a photovoltaic panel 1, a first counterweight 2, a bellow tube 3, a second counterweight 6, a transmission component 7, a rotating wheel 8, a rotating shaft 9, a bearing 10, a support 11, and a gas supply mechanism 101. The gas supply mechanism 101 includes a gas duct 4, a bidirectional gas pump 5, a gas storage tank 12, and a gas pump drive controller 13.

The rotating shaft 9 is supported by the support 11. The two opposite ends of the rotating shaft 9 are supported by the support 11 through the bearing 10. The photovoltaic panel 1 is fixed to the rotating shaft 9, and the smaller eccentricity of the center of gravity of the photovoltaic panel 1 with respect to the axis of the rotating shaft 9, the better. In one embodiment, the center of gravity of the photovoltaic panel 1 is located on the axis of the rotating shaft 9. The rotating wheel 8 is fixed to the rotating shaft 9, and the rotating shaft 9 rotates with the rotation of the rotating wheel 8. The transmission component 7 is located on the rotating wheel 8. The transmission component 7 has a first end and a second end, the first end is connected to a first counterweight 2, and the second end is connected to the second counterweight 6. The first counterweight 2 is connected to the end surface of the bellow tube 3, and the connection between the first counterweight 2 and bellow tube 3 can be a direct connection or an indirect connection. The bellow tube 3 is connected to the bidirectional gas pump 5 through the gas duct 4. The bidirectional gas pump 5 is connected to the gas pump drive controller 13, and the bidirectional gas pump 5 is also connected to the gas storage tank 12. The gas storage tank 12 is used for storing gas, and the bidirectional gas pump 5 is inflated by the gas storage tank 12, or the gas released by the bidirectional gas pump 5 is stored in the gas storage tank 12. The gas storage tank 12 can be omitted. The bellow tube 3 is inflated and deflated by the gas supply mechanism 101 to make the bellow tube 3 expand and contract, thereby driving the first counterweight 2 to move in the vertical direction. There are many ways to connect the first counterweight 2 and the bellow tube 3 that can achieve above functions. The first counterweight 2 can be pushed by the extension of the bellow tube 3, the first counterweight 2 can be pulled by the extension of the bellow tube 3, which will not be described in detail here.

The photovoltaic panel 1 mainly refers to various photovoltaic power generation components used in large-scale photovoltaic power stations, but is not limited to this.

The first counterweight 2 and the second counterweight 6 are placed on both sides of the rotating wheel 8 for balance, and the relative positions of the first counterweight 2 and the second counterweight 6 can be controlled by the expansion and contraction of the bellow tube 3, thereby driving the rotating shaft 9 rotates under the support of the bearing 10 to realize the rotation of the photovoltaic panel 1 along the rotating shaft 9. The material and size of each of the first counterweight 2 and the second counterweight 6 are not limited, and can be designed according to the weight of the photovoltaic panel 1. The driving torque generated by the difference in the mass of the first counterweight 2 and the second counterweight 6 is slightly greater than the frictional resistance torque of the rotating system, so that the photovoltaic panel 1 can be kept stable and balanced at all times. Specifically, the first counterweight 2 and the second counterweight 6 may be metal blocks or cement blocks. In one embodiment, the first counterweight 2 and the second counterweight 6 are metal blocks.

The bellow tube 3 has an opening 32 and a bottom 34 opposite to the opening 32, the opening 32 is connected to the gas duct 4, and the bottom 34 is in direct contact with the first counterweight 2. The material of the bellow tube 3 may be a metal material, or a non-metal material such as polytetrafluoroethylene, silicone rubber, etc., but it is not limited thereto. The bellow tube 3 has good airtightness and flexibility. The diameter and height of the bellow tube 3 are determined by the selection angle of the actual controlling photovoltaic panel 1, and the working pressure can be normal pressure or slightly positive pressure. In one embodiment, the material of the bellow tube 3 is silicone rubber. The material of the bellow tube 3 must have certain properties such as temperature resistance, heat resistance, corrosion resistance, etc., and the bellow tube 3 can expand and contract along the axial direction as the internal gas is charged and discharged. The bellow tube 3 can be stretched and shortened through the inflation and deflation of the bidirectional gas pump 5, to generate a vertical displacement, thereby driving the first counterweight 2 to move up and down, so that the rotating wheel 8 is driven to rotate.

The material of the gas duct 4 is not limited, as long as it can bear a certain pressure to perform gas transmission. The gas duct 4 may be a metal tube or a non-metallic tube. In one embodiment, the gas duct 4 is a silicone rubber tube. The length and diameter of the gas duct 4 can be designed based on actual control requirements. The diameter of the gas duct 4 is not less than 1 mm, and greater than or equal to 1 mm, so as to avoid too much resistance to charging and discharging gas, which is not conducive to gas flow. The gas duct 4 can be optimized in series and parallel according to the number of photovoltaic panels 1 actually controlled.

The transmission component 7 can bear a certain pulling force, is tightly connected to the rotating wheel 8, and can drive the rotating wheel 8 to rotate. The rotating wheel 8 rotates to drive the rotating shaft 9 to rotate. Since the photovoltaic panel 1 is fixed to the rotating shaft 9, the photovoltaic panel 1 rotates with the rotating shaft 9 to realize the automatic tracking of the sunlight by the photovoltaic panel 1.

The length of the transmission component 7 is designed according to the height of the actual support 11. The transmission component 7 may be a flexible component that can play a transmission function, such as a traction steel wire, a chain, a belt, and the like. In one embodiment, the transmission component 7 is a traction steel wire.

The gas storage tank 12 mainly functions to store working gas, and is closely connected to the bidirectional gas pump 5. The working gas in the gas storage tank 12 can be safe and stable gas, such as dry air, nitrogen or inert gas, the working gas can be selected and used according to the specific application environment.

The bidirectional gas pump 5 has no specific type, and can be selected and used according to specific application environments. When the photovoltaic panel 1 generates electric power, the bidirectional gas pump 5 transports the gas in the gas storage tank 12 into the bellow tube 3 through the gas duct 4. When the photovoltaic panel 1 does not generate electric power, the bidirectional gas pump 5 transports the gas in the bellow tube 3 and the gas duct 4 back to the gas storage tank 12 to realize the closed circulation of the working gas.

The gas pump drive controller 13 controls and adjusts the gas filling volume of the bidirectional gas pump 5. The gas filling flow rate of the bellow tube 3 can be controlled according to the change of the sunlight's irradiation angle, and the light receiving angle of the photovoltaic panel 1 can be controlled and maintained in real time according to the timing control method.

The photovoltaic panel 1 is placed on the rotating shaft 9 supported by the support 11, the rotating shaft 9 is connected to the support 11 through the bearing 10, and the photovoltaic panel 1 can rotate under the driving of the rotating wheel 8 hauled by the traction steel wire. The first counterweight 2 and the second counterweight 6 are respectively placed on two opposite sides of the rotating wheel 8 through the traction steel wire, the first counterweight 2 is placed on one side of the rotating wheel 8 through the traction steel wire, and the second counterweight 6 is placed on the other side of the rotating wheel 8 through the traction steel wire. The first counterweight 2 is in direct contact with the bellow tube 3. The gas pressure in the bellow tube 3 is changed by the bidirectional gas pump 5, so that the first counterweight 2 receives the force from the bellow tube 3 and moves in the vertical direction, thereby adjusting the relative position between the first counterweight 2 and the second counterweight 6, and driving the traction steel wire to move, so that the movement of the traction steel wire drives the rotating wheel 8 to rotate. Thus, the photovoltaic panel 1 is driven to rotate at a uniform speed, thereby realizing the real-time automatic tracking of the sunlight by the photovoltaic panel 1.

Figure 3:
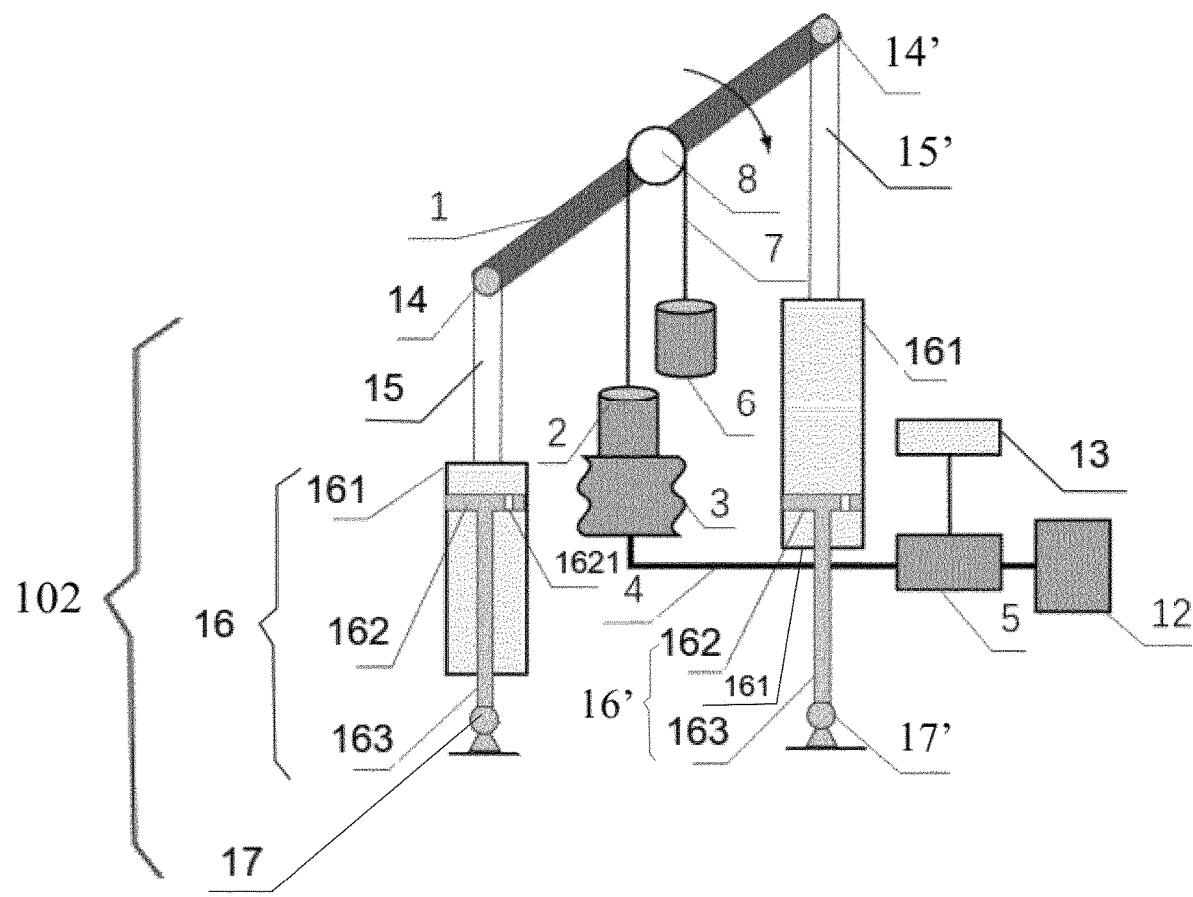
FIG. 3 shows a schematic view of the pressure-driven solar photovoltaic panel automatic tracking device with an anti-shake mechanism of one embodiment according to the present disclosure.

The pressure-driven solar photovoltaic panel automatic tracking device 100 further includes an anti-shake mechanism 102. Referring to FIG. 3, the anti-shake mechanism 102 includes a first moving hinge 14, a second moving hinge 14', a first metal rod 15, a second metal rod 15', a first hydraulic cylinder 16, a second hydraulic cylinder 16', a first fixed hinge 17, and a second fixed hinge 17'. The first moving hinge 14 and the second moving hinge 14' are placed on the photovoltaic panel 1. The first moving hinge 14 and the second moving hinge 14' are respectively placed at appropriate positions between the two opposite sides of the photovoltaic panel 1 and the rotating shaft 9.

In one embodiment, the photovoltaic panel 1 has a first side and a second side opposite to the first side, both the first side and the second side are perpendicular to the axial direction of the rotating shaft 9, the first moving hinge 14 is located on the first side, and the second moving hinge 14' is located on the second side. One end of the first metal rod 15 is fixed to the first moving hinge 14, and the other end of the first metal rod 15 is fixed to the first hydraulic cylinder 16. One end of the second metal rod 15' is fixed to the second moving hinge 14', and the other end of the second metal rod 15' is fixed to the second hydraulic cylinders 16'. One end of the first hydraulic cylinder 16 is connected to the first metal rod 15, and the other end of the first hydraulic cylinder 16 is connected to the first fixed hinge 17. One end of the second hydraulic cylinder 16' is connected to the second metal rod 15', and the other end of the second hydraulic cylinder 16' is connected to the second fixed hinge 17'. The first fixed hinge 17 and the second fixed hinge 17' are fixed to a fixing device or the ground.

Each of the first hydraulic cylinder 16 and the second hydraulic cylinder 16' includes a cylinder 161, a piston 162, and a piston rod 163. The piston 162 and the piston rod 163 are rigidly connected, and the piston 162 defines a damping hole 1621. The piston rod 163 of the first hydraulic cylinder 16 is fixed to the first fixed hinge 17, and the piston rod 163 of the second hydraulic cylinder 16' is fixed to the second fixed hinge 17'.

Specifically, one end of the first metal rod 15 is fixed to the cylinder 161 of the first hydraulic cylinder 16, and one end of the second metal rod 15' is fixed to the cylinder 161 of the second hydraulic cylinder 16'. The cylinder 161 is filled with fluid, such as hydraulic oil. The ratio of the cross-sectional area of the piston 162 to the cross-sectional area of the damping hole 1621 is greater than or equal to 900 and less than or equal to 15,000. In one embodiment, the ratio of the cross-sectional area of the piston 162 to the cross-sectional area of the damping hole 1621 is greater than or equal to 2000 and less than or equal to 3000. In one embodiment, the ratio of the cross-sectional area of the piston 162 to the cross-sectional area of the damping hole 1621 is 2500. The size of the damping hole 1621 can be calculated and designed based on the restricted vibration speed, the type of fluid, and the factors such as not hindering the uniform rotation of the photovoltaic panel 1. The piston 162 can move axially at a low speed inside the cylinder 161, and the damping hole 1621 can prevent the piston 162 and the piston rod 163 from moving quickly. Therefore, the anti-shake mechanism 102 can prevent the photovoltaic panel 1 from shaking or resonating under wind load or other accidental external loads, but the anti-shake mechanism 102 will not affect the normal operation of the pressure-driven solar photovoltaic panel automatic tracking device 10. In severe weather such as rain and snow, the gas pump drive controller 13 can be manually controlled to inflate or deflate the bidirectional gas pump 5, so that the photovoltaic panel 1 stays at a specific angle to prevent the photovoltaic panel 1 from accumulating snow or being blown down by the wind.

Figure 4:
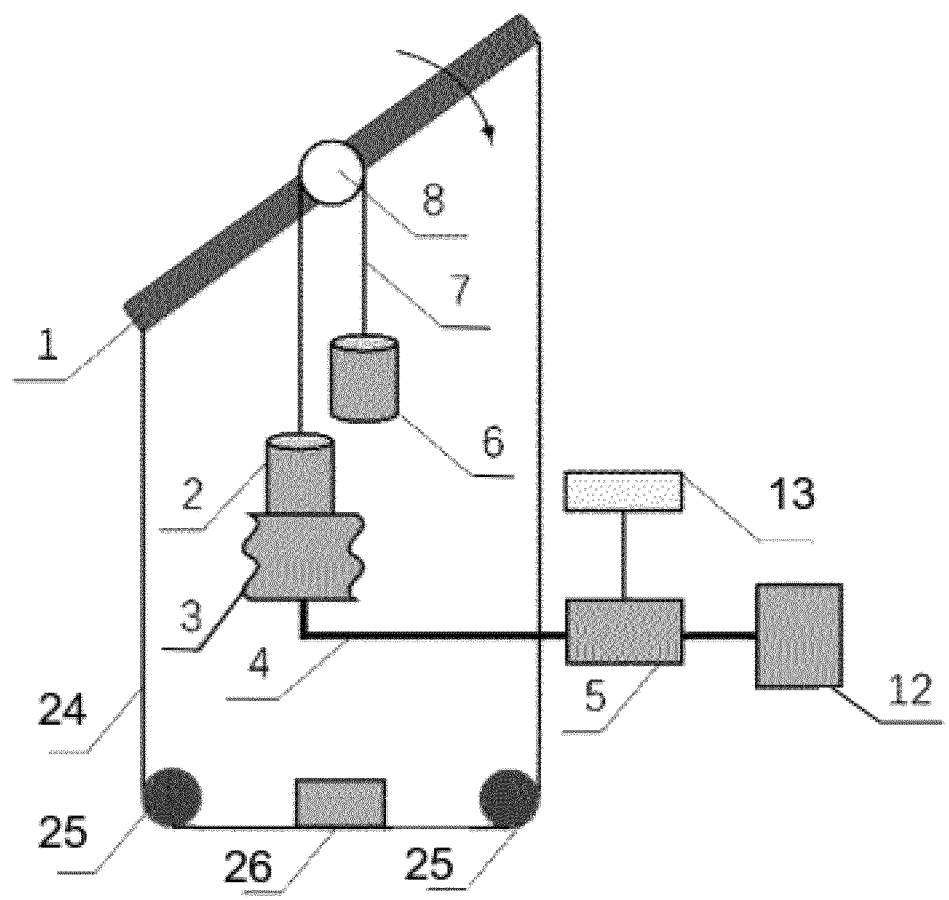
FIG. 4 shows another schematic view of the pressure-driven solar photovoltaic panel automatic tracking device with an anti-shake mechanism of one embodiment according to the present disclosure.

Referring to FIG. 4, the structure of the anti-shake mechanism 102 is not limited to the description of the above-mentioned embodiment, and can also be other structures, as long as the anti-shake mechanism 102 can prevent thy: photovoltaic panel 1 from shaking or resonating. The anti-shake mechanism 102 may also include an anti-shake steel wire 24, at least two fixed pulleys 25, and a locking mechanism 26. The first side and the second side of the photovoltaic panel 1 perpendicular to axial direction of the rotating shaft 9 are respectively fixed to the two opposite ends of the anti-shake steel wire 24. One end of the anti-shake steel wire 24 is connected to the first side of the photovoltaic panel 1, the other end of the anti-shake steel wire 24 is connected to the second side of the photovoltaic panel 1. The anti-shake steel wire 24 is supported by at least two fixed pulleys 25. The anti-shake steel wire 24 between the at least two fixed pulleys 25 is provided with the locking mechanism 26. The locking mechanism 26 has a speed sensor, and the speed sensor 26 can detect the movement speed of the anti-shake steel wire 24. When the movement speed of the anti-vibration wire 24 exceeds the set value, the locking mechanism 26 can be automatically activated to lock the anti-vibration wire 24. Therefore, the anti-shake mechanism 102 can prevent the photovoltaic panel 1 from shaking or resonating under wind load. The location of the locking mechanism 26 is not limited, as long as the anti-shake steel wire 24 can be locked. When there is severe weather such as rain and snow, the gas pump drive controller 13 can be manually controlled to inflate or deflate the bidirectional gas pump 5, so that the photovoltaic panel 1 stays at a specific angle, and the anti-shake steel wire 24 is locked by the locking mechanism 26, thus the photovoltaic panel 1 is fixed at the specific angle to prevent the photovoltaic panel 1 from accumulating snow or being blown down by the wind, etc.

The number of the photovoltaic panel 1 of the pressure-driven solar photovoltaic panel automatic tracking device 10 provided by the present application can be one or multiple. The multiple photovoltaic panels 1 can be connected in series or in parallel. When multiple photovoltaic panels 1 are connected in series, each photovoltaic panel 1 is provided with a rigid rotating shaft 9. The multiple rigid rotating shafts 9 are connected to each other by flexible shafts and couplings, and only one of the rotating shafts 9 is provided with a rotating wheel 8. By controlling the bidirectional gas pump 5 to adjust the gas filling amount of the bellow tube 3, the automatic tracking of the sunlight of the multiple photovoltaic panels 1 can be simultaneously controlled. Even though this type of series connection has a slight lag, the cost can be greatly reduced and the installation is convenient because of the small number of photovoltaic panels 1.

When multiple photovoltaic panels 1 are connected in parallel, each photovoltaic panel 1 is located on a different rotating shaft 9, that is, each photovoltaic panel 1 is provided with a rotating shaft 9, and each rotating shaft 9 is provided with a rotating wheel 8, and each rotating wheel 8 is provided with a transmission component 7. The two opposite ends of each transmission component 7 are respectively connected to the first counterweight 2 and the second counterweight 6. Each first counterweight 2 is in contact with one bellow tube 3, and the multiple bellow tubes 3 are connected to the same bidirectional gas pump 5 through different gas ducts 4. In other words, multiple photovoltaic panels 1 share one single bidirectional gas pump 5 in parallel. By controlling the bidirectional gas pump 5 to adjust the gas filling amount of the bellow tubes 3, the multiple first counterweights 2 are moved in the vertical direction, and the multiple rotating wheels 9 are then driven to rotate, to achieve the multiple photovoltaic panels 1 automatically track the sunlight.

The pressure-driven solar photovoltaic panel automatic tracking device 100 provided by the embodiment of the present application is mainly aimed at the solar photovoltaic panel's automatic tracking of sunlight, mainly horizontal single-axis tracking, and can also be tilted single-axis tracking. The solar photovoltaic panel 1 of the pressure-driven solar photovoltaic panel automatic tracking device 100 can track the sunlight automatically in the east-west direction or the north-south direction, which is suitable for large-scale solar photovoltaic power plants, distributed integrated energy systems and other fields.

The pressure-driven solar photovoltaic panel automatic tracking device 100 provided by the embodiment of the present application does not use the deceleration mechanism and drive motor in the prior art to drive the photovoltaic panel 1 to rotate. The pressure-driven solar photovoltaic panel automatic tracking device 100 controls the photovoltaic panel 1 to rotate at a constant speed without intermittent by inflating and deflating the bellow tube 3, so as to realize the real-time automatic tracking of the sunlight by the photovoltaic panel 1. Because the photovoltaic panel 1 rotates at a constant speed to track the sunlight in real time, the light energy utilization rate is high, and the pressure-driven solar photovoltaic panel automatic tracking device 100 has a simple structure. The power consumption of the bidirectional gas pump 5 is extremely low, so the driving power of the bidirectional gas pump 5 is very small. The material of bellow tube 3 has long service life, high temperature resistance, corrosion resistance, aging resistance and fatigue resistance, good elasticity, wide operating temperature range, and high reliability. Therefore, the pressure-driven solar photovoltaic panel automatic tracking device 100 has better stability and longer life. Moreover, the center of gravity of the photovoltaic panel 1 of the pressure-driven solar photovoltaic panel automatic tracking device 100 is just at the axis of the rotating shaft 9, thus there is no additional torque, so that the driving power is small.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may comprise some indication in reference to certain steps. However, the indication used is only to be viewed for identification purposes and not as a suggestion as to an order for the steps.

What is claimed is:

1. A pressure-driven solar photovoltaic panel automatic tracking device comprising:
   a rotating shaft;
   a photovoltaic panel fixed to the rotating shaft;
   a rotating wheel fixed to the rotating shaft;
   a transmission component placed on the rotating wheel, wherein the transmission component has a first end and a second end opposite to the first end;
   a first counterweight connected to the first end of the transmission component;
   a second counterweight connected to the second end of the transmission component;
   a bellow tube keeping vertically disposed and having a bottom, wherein the first counterweight is in direct contact with the bottom of the bellow tube; and
   a bidirectional gas pump connected to the bellow tube, wherein the bellow tube is vertically displaced when the bellow tube is inflated or deflated by the bidirectional gas pump, thereby driving the first counterweight to move up and down, so that the rotating wheel is driven to rotate.

2. The pressure-driven solar photovoltaic panel automatic tracking device of claim 1, further comprising an anti-shake mechanism used to prevent the photovoltaic panel from shaking or resonating.

3. The pressure-driven solar photovoltaic panel automatic tracking device of claim 2, wherein the anti-shake mechanism comprises a first moving hinge, a second moving hinge, a first metal rod, a second metal rod, a first hydraulic cylinder, a second hydraulic cylinder, a first fixed hinge, and a second fixed hinge; two opposite to sides of the photovoltaic panel are respectively connected to the first hydraulic cylinder and the second hydraulic cylinder by the first moving hinge, the second moving hinge, the first metal rod, and the second metal rod; and the first hydraulic cylinder and the second hydraulic cylinder are fixed by the first fixed hinge and the second fixed hinge.

4. The pressure-driven solar photovoltaic panel automatic tracking device of claim 3, wherein each of the first hydraulic cylinder and the second hydraulic cylinder comprises a cylinder, a piston, and a piston rod; the piston and the piston rod are rigidly connected, and the piston defines a damping hole; the piston rod of the first hydraulic cylinder is fixed to the first fixed hinge, and the piston rod of the second hydraulic cylinder is fixed to the second fixed hinge; one end of the first metal rod is fixed to the first moving hinge, and the other end of the first metal rod is fixed to the cylinder of the first hydraulic cylinder; and one end of the second metal rod is fixed to the second moving hinge, and the other end of the second metal rod is fixed to the cylinder of the second hydraulic cylinder.

5. The pressure-driven solar photovoltaic panel automatic tracking device of claim 2, wherein the anti-shake mechanism further comprises an anti-shake steel wire, at least two fixed pulleys, and a locking mechanism; the photovoltaic panel has a first side and a second side opposite to the first side, both the first side and the second side are perpendicular to an axial direction of the rotating shaft, the first side and the second side of the photovoltaic panel are respectively fixed to the two opposite ends of the anti-shake steel wire; and the anti-shake steel wire is supported by the at least two fixed pulleys, and the anti-shake steel wire is provided with the locking mechanism.

6. The pressure-driven solar photovoltaic panel automatic tracking device of claim 1, wherein the gas supply mechanism comprises a gas duct, a bidirectional gas pump, and a gas pump drive controller; and the bellow tube is connected to the bidirectional gas pump by the gas duct, the bidirectional gas pump is connected to the gas pump drive controller, and the gas filling amount of the bellow tube is adjusted by the gas pump drive controller.

7. The pressure-driven solar photovoltaic panel automatic tracking device of claim 6, wherein a gas pressure in the bellow tube is changed by the bidirectional gas pump, so that when the first counterweight receives a force from the bellow tube, the first counterweight moves in the vertical direction, thereby adjusting a relative position between the first counterweight and the second counterweight, driving the transmission component to move, driving the rotating wheel to rotate, and driving the photovoltaic panel to rotate.

8. The pressure-driven solar photovoltaic panel automatic tracking device of claim 6, wherein the gas pump drive controller controls an inflation flow of the bellow tube according to a change of a sunlight's irradiation angle, and a light receiving angle is controlled and maintained in real time.

9. The pressure-driven solar photovoltaic panel automatic tracking device of claim 6, wherein the gas pump drive controller controls an inflation flow of the bellow tube in a timing control manner, and a light receiving angle is controlled and maintained in real time.

10. The pressure-driven solar photovoltaic panel automatic tracking device of claim 1, further comprises a plurality of photovoltaic panels and a plurality of rotating shafts, and one of the plurality of photovoltaic panels is fixed to one of the plurality of the rotating shafts; the plurality of rotating shaft are mechanically connected to each other, and the rotating wheel is fixed to only one of the plurality of rotating shafts; and a gas filling amount of the bellow tube is adjusted by controlling the bidirectional gas pump, thereby simultaneously controlling the plurality of photovoltaic panels to automatically track sunlight.

11. The pressure-driven solar photovoltaic panel automatic tracking device of claim 1, wherein a center of gravity of the photovoltaic panel is located on an axis of the rotating shaft.

12. The pressure-driven solar photovoltaic panel automatic tracking device of claim 1, wherein the bellow tube has an opening opposite to the bottom, and the gas supply mechanism is in direct contact with the opening of the below tube.

* * * * *